E. S. HARDEN.
FOOT LEVER HOLDING MECHANISM.
APPLICATION FILED MAR. 15, 1915.
1,154,012.
Patented Sept. 21, 1915.
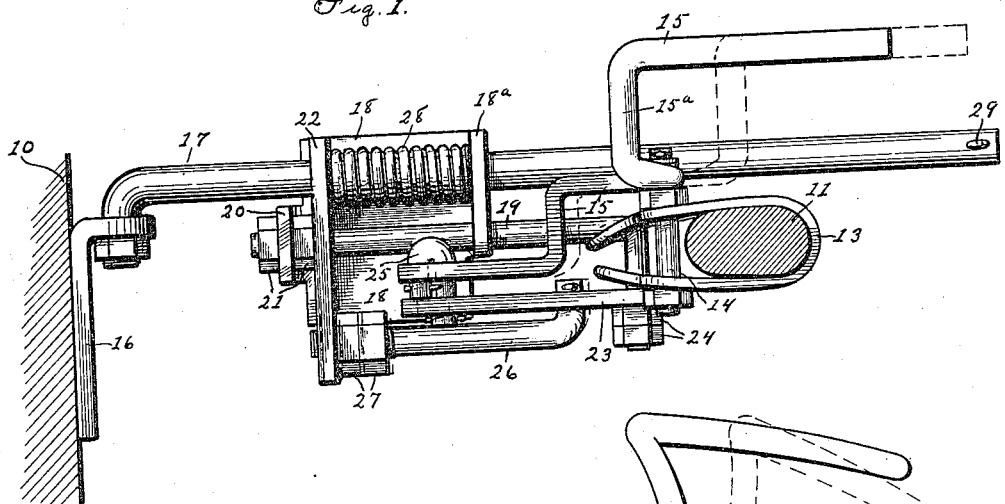
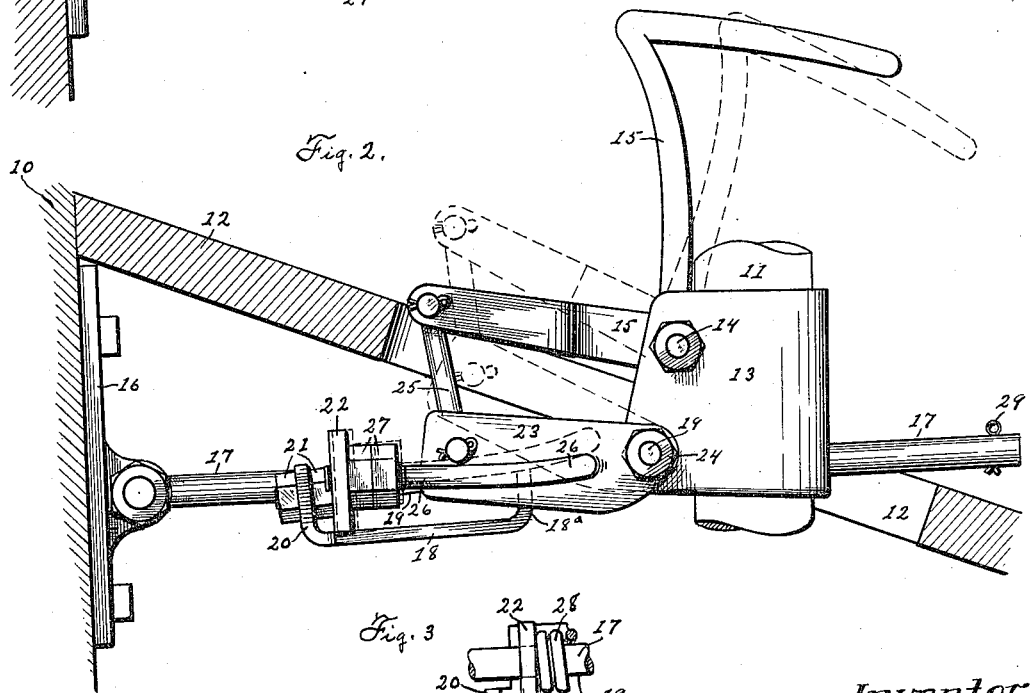
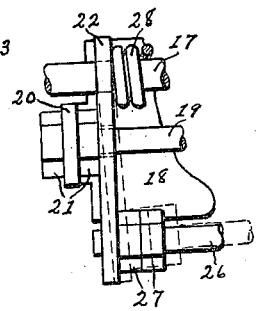
Witnesses
Inventor
Emmett Sidney Harden.
By Earl M. Sinclair
Attorney.

UNITED STATES PATENT OFFICE.

EMMETT SIDNEY HARDEN, OF CASEY, IOWA.

FOOT-LEVER-HOLDING MECHANISM.

1,154,012.  Specification of Letters Patent. Patented Sept. 21, 1915.

Application filed March 15, 1915. Serial No. 14,427.

*To all whom it may concern:*

Be it known that I, EMMETT SIDNEY HARDEN, citizen of the United States of America, and resident of Casey, Guthrie county, Iowa, have invented a new and useful Foot-Lever-Holding Mechanism, of which the following is a specification.

The object of this invention is to provide an improved mechanism for securely holding the foot levers of automobiles in certain positions.

A further object of this invention is to provide an improved mechanism for securing the foot levers of automobiles in certain positions without the continuation of foot pressure thereon.

My invention consists in the construction, arrangement and combination of elements hereinafter set forth, pointed out in my claims and illustrated by the accompanying drawing, in which—

Figure 1 is a plan illustrating my improvement in position for use. Fig. 2 is a side elevation of the same, dotted lines indicating position of the parts in locking engagement. Fig. 3 is a detail, on an enlarged scale, of certain of the locking devices.

In the construction and application of the device as shown the numeral 10 designates a frame member, such as the dash, of an automobile, and the numeral 11 designates a foot lever projecting through an inclined foot board 12 in a common manner. The mechanism as shown is especially adapted for use on "Ford" automobiles, in which a single foot lever is employed for controlling the two speeds of the vehicle, the forward position being for low speed, the rearmost position for high speed, and an intermediate position for neutral; it being understood that it is necessary to hold the lever in forward position by continuous foot pressure at all times when it is desired to employ the low speed. It is the purpose and function of this device to provide supplemental means for mechanically holding the lever in forward position, thus insuring its remaining in this position, while permitting the operator to employ his foot for other purposes. It is not designed to be used except in emergencies, as where the operator is compelled to use the low speed for an unusual length of time, as in climbing a hill. The device is also adapted for use on foot levers controlling the brakes of a motor vehicle of any style, to hold the brakes securely in engagement independent of any foot pressure by the operator.

A collar 13 is mounted on the shank of the foot lever 11, near the upper end thereof, and a bolt 14 passes through the forward upper portion of said collar and provides a fulcrum for a special foot lever 15 of bell-crank form, the upper end portion of which projects through the foot-board 12 adjacent to and at one side of the foot lever 11. A bracket 16 is fixed to the rear face of the frame member 10 and a rod 17 is pivotally connected at one end to said bracket, for articulation on a transverse horizontal axis. A base plate 18 is provided and is formed with an upturned flange 18$^a$ on its rear margin, which flange is apertured to slide freely on the rod 17. A guide rod 19 is mounted parallel to and at one side of the rod 17 and passes freely through the flange 18$^a$. The guide rod 19 is bent at right angles at its rear end and is pivotally connected to the forward lower portion of the collar 13. An apertured upturned ear 20 is formed on the forward portion of the base plate 18, and the forward end portion of the guide rod 19 passes through said ear, is threaded and secured by nuts 21 on opposite sides thereof. A clamping plate 22 is mounted transversely across the forward end portion of the base plate 18, at the rear of the ear 20, and is formed with an aperture through which the guide rod 19 passes freely, and with an aperture adjacent one end snugly fitted to the rod 17. A lever 23 is pivotally connected at its rear end to the projecting end portion of the transverse arm of the guide rod 19, which arm is threaded on its end and provided with locking nuts 24. The forward end portion of the lever 23 is pivotally connected, by a link 25, to the forward end of the lower arm of the bell-crank lever 15, said lower arm being laterally offset to bring its forward end into vertical alinement with the said lever 23. A toggle member 26 is pivotally connected at its rear end to and intermediate of the ends of the toglever 23, and the forward end of said toggle member projects into an aperture in the adjacent end of the clamping plate 22, is threaded, and carries locking and adjusting nuts 27 bearing against the rear face of said clamping member. The center of the pivotal connection of the toggle member 26 to the lever 23 preferably is below a line connecting the central points of the pivotal connection of said lever to the guide arm 19 and the connection of the opposite end of said toggle member to the clamping plate 22, to facilitate the toggle action of the members 23, 26 in the proper direction.

An expansive coil spring 28 is coiled around the rod 17 between the flange 18$^a$ and the clamping plate 22, and it is the tendency of said spring to throw said clamping plate into frictional clamping engagement with said rod by overcoming its normal parallel relation to said flange 18$^a$.

In practical use the parts are assembled as shown and the bell-crank lever 15 normally is maintained in its foremost position, as shown by full lines in the drawing, in which position the toggle member 26 and lever 23 are in their extended positions, that is nearly in alinement, so that said toggle member, through the nuts 27, exerts a pressure against the rear face of the clamping member 22. This pressure overcomes the pressure of the spring 28 on the clamping plate 22 and maintains said plate in a position parallel to the flange 18$^a$ and exactly at right angles to the rod 17, so that such clamping member may slide freely on said rod 17. When the parts are in these positions there is nothing to interfere with any movement of the pedal lever 11 at the will of the operator, as the parts move freely and slidingly with said pedal lever, on the rod 17. When it is desired to secure the pedal lever 11 in either forward or intermediate position, for low speed or neutral, foot pressure is applied to the upper end of the bell-crank lever 15 to the end of raising the forward end of the lower arm of said lever, and raising the forward end of the lever 23, through the link 25. This has the effect of moving the toggle members 23, 26 to contracted or inoperative position, thereby relieving the pressure on the free end of the clamping member 22 and permitting the spring 28 to act on the opposite end thereof. This action of the spring 28 throws the clamping plate to an oblique position so that it frictionally engages and clamps upon the rod 17, thus preventing any movement of the members rearwardly on said rod, and holding the pedal lever 11, through the collar 13, against rearward movement.

A forward movement of the mechanism on the rod 17 may be obtained even when the parts are in locking or clamping engagement, for the reason that any pressure on the parts is against and tends to overcome the pressure of the spring 28, and permits a further forward movement of the pedal lever under pressure. This is of advantage in the event the operator, in pressing the pedal lever into low speed and simultaneously depressing the locking mechanism, should permit his foot to slip from the pedal lever before he has it in the proper position, in which case he may continue the movement of said pedal lever even though the clamping engagement has been effected. Under no circumstances, however, can the pedal lever move rearwardly while the clamping engagement is in effect.

The upper arm of the bell-crank lever 15 preferably is offset transversely at 15$^a$ for engagement with the head of the pedal lever 11, to limit rearward movement of said bell-crank lever.

The rod 17 preferably is formed of cold rolled steel and the clamping plate 22 of tool steel to prevent wear and insure accurate and effective clamping engagement of such parts.

It is to be understood that the device may be employed on any vehicle having foot-controlled brakes, for securing the brake lever in braking position. The necessary modifications for adapting the device to vehicles of different construction may be made without departing from the spirit of my invention.

A stop pin 29 is mounted through the rear end of the rod 17 to prevent disengagement of the flange 18$^a$ therefrom.

I claim as my invention—

1. A device of the class described, comprising, in combination with the foot-lever of an automobile, a member adapted to be secured to and for movement with the shank of said foot-lever, an operating lever fulcrumed on said member, a rod secured to the frame of the automobile, a clamping plate through which said rod passes, yielding pressure devices acting to hold said clamping plate in clamping engagement on said rod, and means connected with said operating lever to hold said clamping plate out of clamping engagement, against the action of the yielding pressure devices.

2. A device of the class described, comprising, in combination with the foot-lever of an automobile, a member adapted to be secured to the shank of said foot-lever, an operating lever fulcrumed on said member, a rod pivoted at one end to the automobile frame, a clamping plate slidingly mounted on said rod, yielding pressure devices acting to hold said clamping plate in clamping engagement on said rod, and means connected with said operating lever for holding said clamping plate out of clamping engagement, against the action of the yielding pressure devices.

3. A device of the class described, comprising, in combination with the foot-lever of an automobile, a member adapted to be secured to the shank of said foot-lever, an operating lever of bell-crank form fulcrumed on said member, a rod secured at one end to the automobile frame, a clamping plate slidingly mounted on said rod, yielding pressure devices acting to hold said clamping plate in clamping engagement with said rod, and toggle levers connected with said operating lever for overcoming the action of the yielding pressure devices at times.

4. A device of the class described, comprising, in combination with the foot-lever of an automobile, a rod pivotally secured at one end to the automobile frame, a clamping plate slidingly mounted on and adapted for frictional engagement with said rod, a spring coiled around said rod and tending to hold said clamping plate in clamping engagement therewith, a collar secured to and movable with the shank of the foot-lever, an operating lever fulcrumed on said collar, and toggle levers pivoted on said collar and connected with said operating lever, said toggle levers adapted to exert pressure on said clamping plate to overcome the action of said spring.

5. A device of the class described, comprising, in combination with the foot-lever of an automobile, a member fixed against longitudinal movement, a member secured to and movable with said foot-lever, a clamping member tending to clamping engagement with said fixed member, and pivotally secured to said securing member, whereby movement of said foot-lever in one direction is prevented, and means for throwing said clamping member out of clamping engagement.

6. A device of the class described, in combination with the foot-lever of an automobile, a member fixed to the automobile frame, a securing member fixed to and movable with said foot-lever, a spring-pressed clamping member adapted for engagement with said fixed member and pivotally secured to said securing member, and lever-operated toggle devices for disengaging said clamping member against the action of its spring.

7. A device of the class described, comprising, in combination with the foot-lever of an automobile, a rod pivoted to the automobile frame, a base plate formed with an upturned flange sliding freely on said rod, a clamping plate approximately parallel to said flange and snugly fitted for sliding engagement with said rod, a spring coiled around said rod and impinging said flange and clamping plate, and tending to prevent movement of the latter member on said rod, a collar secured to and movable with the foot-lever, pivotal connections between said collar and an intermediate portion of the clamping plate, an operating lever fulcrumed on said collar, and toggle devices connected with said operating lever and adapted to exert a pressure on said clamping plate opposite to the spring pressure thereon.

8. A device of the class described, comprising, in combination with the foot-lever of an automobile, a rod pivoted at one end to the automobile frame, a base plate formed with an upturned flange sliding freely on said rod, a clamping plate mounted on said base plate parallel to said flange, said clamping plate having one end slidingly mounted on said rod, an expansive spring coiled around said rod between said flange and clamping plate, and tending to prevent sliding movement of said clamping plate on the rod, a collar secured to and movable with said foot-lever, pivotal connections between said collar and the central portion of said clamping plate, an operating lever of bell-crank form fulcrumed on said collar, toggle devices between said collar and the opposite end of said clamping member and adapted when expanded to overcome the pressure of said spring on said clamping member, and pivotal connections between the operating lever and said toggle devices.

9. A device of the class described, comprising, in combination with the foot-lever of an automobile, a rod pivoted to the automobile for oscillation on a horizontal axis, a base plate formed with an upturned flange sliding freely on said rod, a clamping plate mounted on said base plate parallel to said flange, said clamping plate having one end slidingly mounted on said rod, an expansive coil spring coiled around said rod between said flange and clamping plate, and tending to prevent sliding movement of said clamping plate on the rod, a collar secured to and movable with the foot-lever, an upturned ear on said base plate in front of said clamping plate, a guide rod adjustably secured to said ear and passing freely through said clamping plate and flange, said guide rod being bent at right angles at its rear end and pivoted in said collar, toggle devices pivoted on the rear arm of said guide rod, and adjustably connected at the forward end to the opposite end of said clamping plate, and a lever pivoted to said collar and acting on said toggle devices.

10. A device of the class described, comprising, in combination with the foot-lever of an automobile, a rod pivoted to the automobile frame for oscillation on a transverse horizontal axis, a clamping device slidingly mounted on said rod and adapted to be clamped thereto, a securing device attached to said foot-lever and movable therewith, pivotal connections between said collar and the clamping devices, and means for throwing said clamping devices out of clamping engagement with said rod.

Signed by me at Des Moines, Iowa, this tenth day of March, 1915.

EMMETT SIDNEY HARDEN.

Witnesses:
B. F. DENNEY,
EARL M. SINCLAIR.

Copies of this patent may be obtained for five cents each, by addressing the "Commissioner of Patents, Washington, D. C."